W. F. MACKLIN.
ARMORED TIRE.
APPLICATION FILED MAY 20, 1912.
1,165,888.
Patented Dec. 28, 1915
2 SHEETS—SHEET 1.
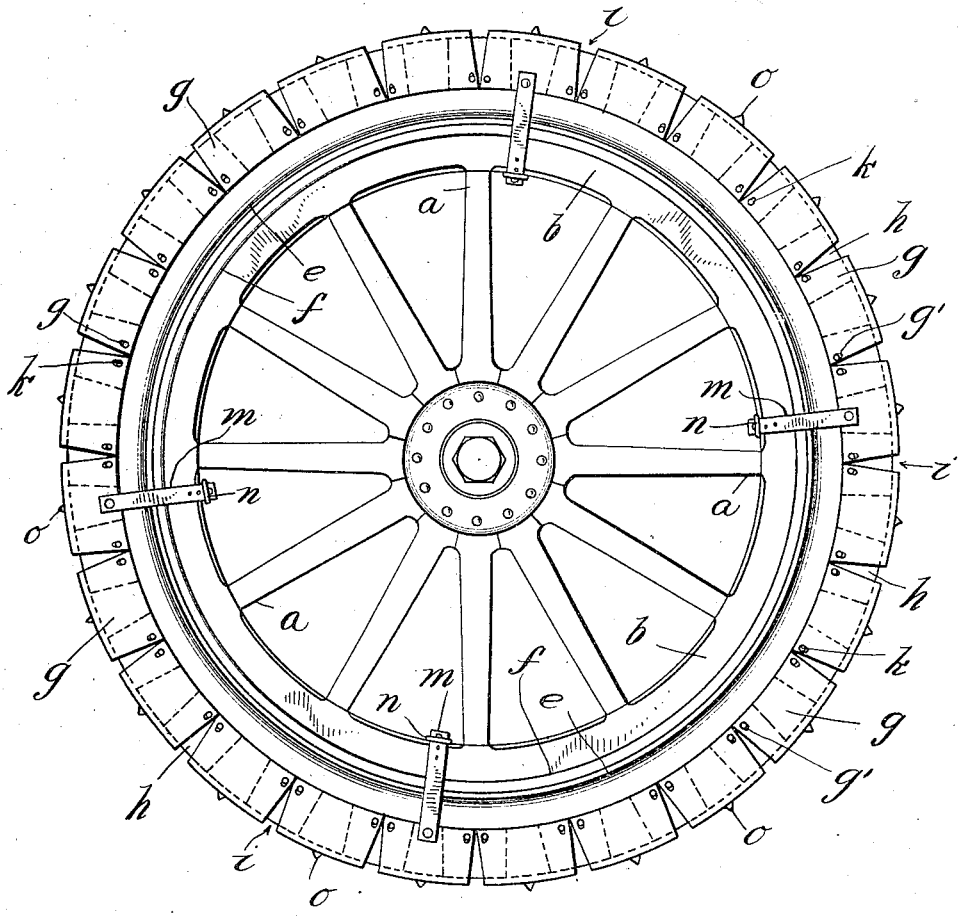
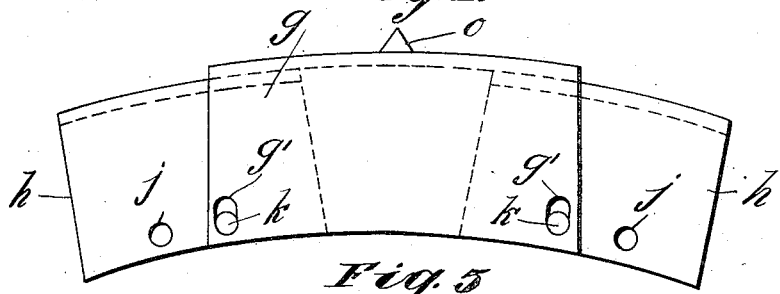

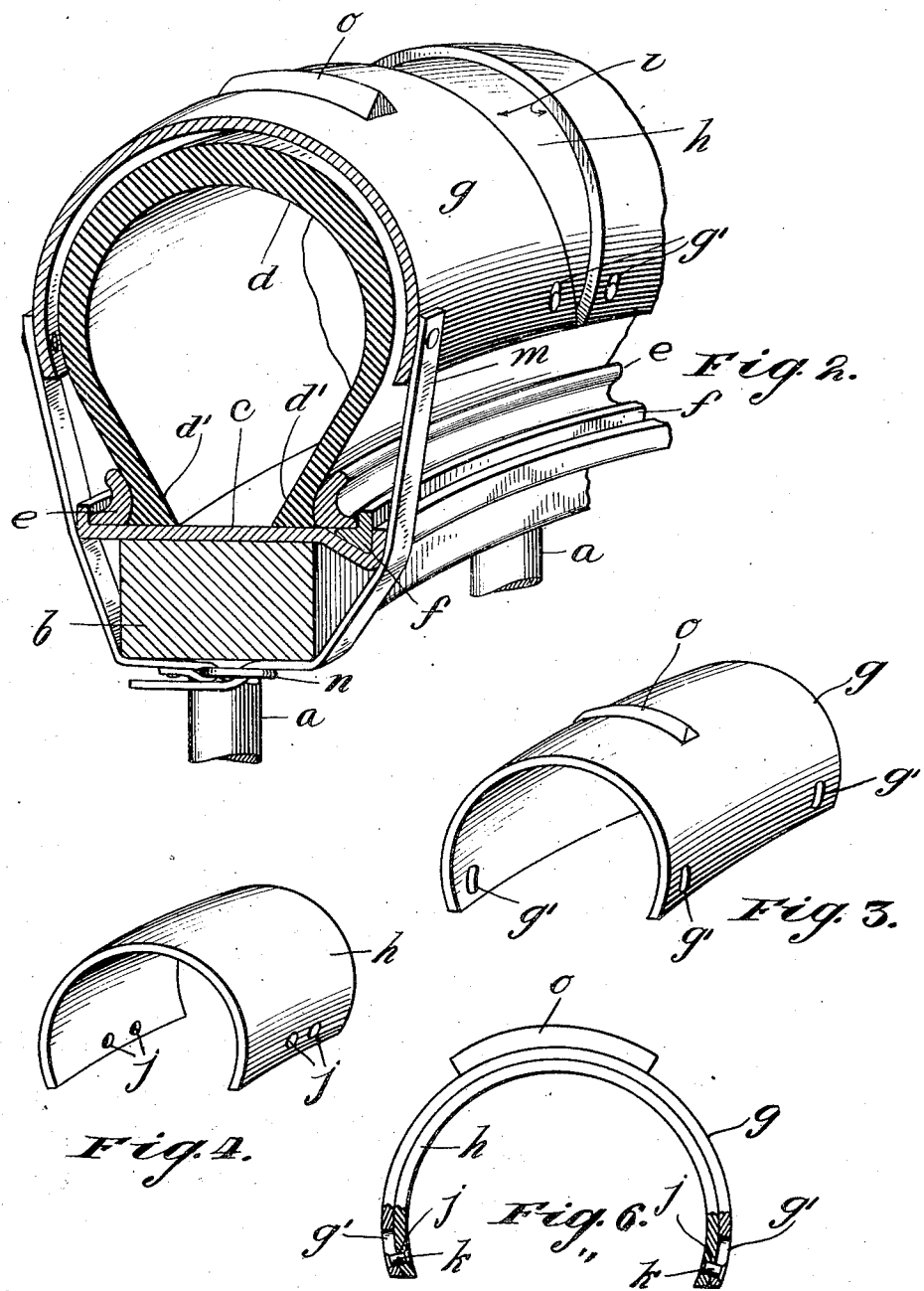

UNITED STATES PATENT OFFICE.

WILLMOT FREDRICK MACKLIN, OF APPLETON, WISCONSIN.

ARMORED TIRE.

1,165,888.   Specification of Letters Patent.   Patented Dec. 28, 1915.

Application filed May 20, 1912. Serial No. 698,655.

*To all whom it may concern:*

Be it known that I, WILLMOT FREDRICK MACKLIN, a citizen of the United States of America, residing at Appleton, in the county of Outagamie and State of Wisconsin, have invented certain new and useful Improvements in Armored Tires, of which the following is a specification, reference being had to the accompanying drawings.

This invention relates to improvements in armored tires and particularly to improvements in armored tires adapted for use upon the wheels of self-propelled vehicles; and an object of this invention is to provide a tire with a tire protector or tire armor which will prove simple in construction, comparatively cheap in manufacture and durable and efficient in use and operation.

Another object of this invention is to provide a tire armor which will fit any of the ordinary makes of tire now on the market and which will be susceptible of easy adjustment upon and removal from the tire.

In the drawings illustrating the principle of this invention and the best mode now known to me of applying that principle, Figure 1 is a side elevation of a wheel embodying this invention in its construction; Fig. 2 is a fragmentary perspective view which is on an enlarged scale and partly in section and which shows the manner in which the armor is fitted on the tire; Fig. 3 is a perspective view of one of the outer armor sections; Fig. 4 is a perspective view of one of the inner armor sections; Fig. 5 is a side elevation showing an outer section assembled with two inner sections; and Fig. 6 is an end view of what is shown in Fig. 5, parts being broken away for clearness of illustration of the section-connecting devices.

The outer ends of the spokes $a$ are mounted in the felly $b$ which carries the rim $c$ in which is mounted the pneumatic tire $d$ the edges $d'$ of which are supported between the reversible circumferentially-extending rings $e$, adjacent to one of which extends the removable retaining band $f$.

The construction so far described is old and well known and forms no part of this invention.

My new tire-armor consists of outer sectional elements $g$ and inner sectional elements $h$; and these elements are assembled as is best shown in Figs. 1 and 5, that is to say: Into each end of an outer sectional element $g$ projects an end of an inner sectional element $h$ so that the V-shaped gaps $i$ (Fig. 1) between the opposed ends of successive (or adjacent) outer elements $g$ are bridged by the inner elements $h$. Each outer element $g$ is formed at each of its ends with a pair of slots $g'$, which lie near the longitudinal edges of the element (Fig. 3); and each inner element $h$ is formed near the middle of each of its longitudinal edges with a pair of holes $j$ (Fig. 4). The elements $g$, $h$ are held in assembled relation by means of headed pins or rivets $k$ which pass through the holes $j$ into the slots $g'$ and the heads of which are countersunk (Fig. 6). In this way the outer and inner elements are jointed together so that the outer elements $g$ hinge on the inner elements $h$.

When the tire-armor is assembled on the tire, the elements are all joined as just described except at one joint,—that is, all the elements are connected except the two end elements, considering the armor as extended. The tire $d$ being deflated, the armor is adjusted upon the tire and the two final rivets $k$ are clenched (whereby the ends of the armor are pivotally fastened together); and the tire is then inflated. The armor extends more than half-way around the tire (Fig. 2) and covers more than half of the portion of the tire lying outside the channel or rim $c$; hence when the tire is inflated fully, the armor will grip the tire firmly. However, as a precaution against danger of the armor's slipping upon the automobile's being started, four straps $m$ may be provided, two of which may be arranged in front of diametrically opposite spokes and the other two in rear of diametrically opposite spokes which lie at approximately right angles to the first-named pair of spokes (Fig. 1). The parts of each strap may be fastened by a common buckle fastening $n$, as shown in Fig. 2 and the anchored ends of the straps are fastened to outer sections $g$ of the armor.

The outer sections may be formed with edged calks $o$, which are centrally disposed and extend transversely of the section (Fig. 3). These calks may be welded upon the section and are preferably made of steel. The purpose of the calks is obviously to increase the tractive effort of the wheel and to prevent slipping and skidding thereof on the roadway.

The armor is preferably made of spring steel the thickness of which may be varied to suit the nature of the duty or service which the armor is to perform. At the top of the wheel the ends of adjacent outer sections $g$ are separated by about one and one-quarter inches; but when the outer sections bear under load upon the roadway, the opposed ends of adjacent outer sections close toward each other, and by thus yielding, absorb shock and produce a cushioning effect. Since the rivet holes $g'$ in the outer sections are elongated, the outer sections $g$ are free to slide upward as the load comes upon them and the rivets are saved from rapid wear and the rivet-heads from being cut off. The metal being spring steel, the armor will not crack or wear out at the edges due to the rapid succession of up-and-down (or in-and-out) movements of the sections.

While the size of the sections may, of course, be varied to suit any particular case, I have found that a length of from five to seven inches for the outer or longer sections $g$ will be found suitable for the average tire; and the inner sections will then be made from four to five inches long. The rivets $k$ are made about three-eighths of an inch in diameter and the calks $o$ may generally be made of any width from three-eighths of an inch up, of any suitable height and of desirable length across the armor section.

The principal features of advantage which are possessed by my new tire-armor over those heretofore placed upon the market are (1) greater flexibility and cushioning effect; (2) increased life or durability; (3) cheapness of manufacture; and (4) greater efficiency in protecting from wear and punctures the pneumatic tire which it incloses.

I claim:

1. A tire armor consisting of a plurality of curved tapering outer sections arranged around the tire adapted to abut against each other at their inner longitudinal edges, a plurality of curved inner sections arranged within and between the outer tapering sections, connecting means between the inner and outer sections consisting of slots arranged near the ends of the outer sections and pins arranged near the center of the inner sections, said pins adapted to project through said slots in the outer sections, thereby permitting pivotal and radial movements of the outer sections relative to the inner sections.

2. A tire armor consisting of a plurality of curved tapering outer sections arranged around the tire adapted to abut against each other at their inner longitudinal edges, a plurality of curved inner sections arranged within and between the outer tapering sections, slots arranged adjacent each corner of the outer sections and a plurality of pins arranged near the center on each side of the inner sections, said pins adapted to project through said slots in the outer sections thereby permitting pivotal and radial movements of the outer sections relative to the inner sections.

Signed at Appleton, Wisconsin, this 11th day of May, 1912, in the presence of the two undersigned witnesses.

WILLMOT FREDRICK MACKLIN.

Witnesses:
ELSIE KOFFEND,
J. P. FRANK.